United States Patent [19]
Kubo et al.

[11] Patent Number: 4,631,668
[45] Date of Patent: Dec. 23, 1986

[54] STORAGE SYSTEM USING COMPARISON AND MERGER OF ENCACHED DATA AND UPDATE DATA AT BUFFER TO CACHE TO MAINTAIN DATA INTEGRITY

[75] Inventors: Kanji Kubo; Chikahiko Izumi, both of Hadano, Japan

[73] Assignee: Hitachi, Ltd., Tokyo, Japan

[21] Appl. No.: 460,018

[22] Filed: Jan. 21, 1983

[30] Foreign Application Priority Data

Feb. 3, 1982 [JP] Japan .................. 57-14964

[51] Int. Cl.[4] .......... G06F 13/00/13/18; G06F 13/12
[52] U.S. Cl. .................................................. 364/200
[58] Field of Search ... 364/200 MS File, 900 MS File

[56] References Cited

U.S. PATENT DOCUMENTS

| 3,588,829 | 6/1971 | Boland et al. | 364/200 |
| 4,044,337 | 8/1977 | Hicks et al. | 364/200 |
| 4,077,059 | 2/1978 | Cordi | 364/200 |
| 4,317,168 | 2/1982 | Messina et al. | 364/200 |
| 4,394,733 | 7/1983 | Swenson | 364/200 |
| 4,410,965 | 10/1983 | Moore | 365/230 |
| 4,413,319 | 11/1983 | Schultz | 364/200 |
| 4,426,681 | 1/1984 | Bacot et al. | 364/200 |
| 4,437,149 | 3/1984 | Pomerene et al. | 364/200 |
| 4,500,954 | 2/1985 | Duke et al. | 364/200 |
| 4,574,346 | 3/1986 | Hartung | 364/200 |

Primary Examiner—Archie E. Williams
Attorney, Agent, or Firm—Antonelli, Terry & Wands

[57] ABSTRACT

A storage system includes a storage for storing data, and a store buffer for temporarily buffering data before storing it into the storage. A store request is applied to the store buffer, and store data accompanied by the store request is applied to the store buffer. When a fetch request for the storage does not exist, the store data buffered in the store buffer is transferred from the store buffer to the storage and is stored therein.

3 Claims, 8 Drawing Figures

STORAGE SYSTEM USING COMPARISON AND MERGER OF ENCACHED DATA AND UPDATE DATA AT BUFFER TO CACHE TO MAINTAIN DATA INTEGRITY

BACKGROUND OF THE INVENTION

The present invention relates to a storage system having store data buffering means. More particularly, it relates to a storage system well suited to a data processing system which includes a cache for retaining copies of some of the data retained in a main storage and which is controlled by a pipeline system wherein "fetch" and "store" operations are simultaneously generated for the cache.

Storages (a main storage and a cache) in a data processing system are controlled to perform the respective operations of fetching data, namely, an instructon and operands, and of storing an operand obtained as the result of instruction execution. Further, since the cache has the character of a copy of the main storage, the "store" operation involving data storage into a buffer storage occurs therein on the basis of a so-called block transfer in which a block composed of a certain number of bytes is fetched from the main storage and registered in the buffer storage. In the cache in a data processing system of the type which is capable of pipeline operation, these operations of instruction fetch, operand fetch, store and block transfer can occur at the same time. Requests therefor are given priority levels, and when they occur, the buffer storage is accessed in the order of (1) block transfer, (2) store, (3) operand fetch and (4) instruction fetch. When such requests for access to the cache are in contention, the processing of the low priority level is deferred to slow the instruction processing.

In order to lessen the contention of the access requests for the cache, an improved system has also been proposed in which the first half of one machine cycle is allotted to the store of data into the cache, and the latter half thereof is allotted to the fetch of data from the cache, so as to prevent contention between the store operation and the operand or instruction fetch operation from arising. This system, however, has the problem that the access time for the cache becomes equal to a half machine cycle, so cache constituents of high speed are required.

Japanese Patent Application Publication No. 53-24260 discloses a data processing system which avoids the competition of requests for access to a cache. This system, however, does not disclose a technique for reducing the contention between a store request and a fetch request which may arise from a data processing unit.

SUMMARY OF THE INVENTION

An object of the present invention is to provide a storage system which lessens the contention between "store" and "fetch" operations for a storage.

The storage system of the present invention comprises storage means for storing data, and store buffer means for temporarily buffering store data for the storage means before the data is stored in the storage means. The store data buffered in the store buffer means is stored in the storage means when no fetch request exists for the storage means.

In a preferred embodiment of the present invention, when the amount of store data buffered in the store buffer means has reached a predetermined amount, for example, when the store buffer means has been filled up, the store buffer means transfers, even with the existence of a fetch request for the storage means, the buffered store data into the storage means with priority given thereto over the fetch request.

Since the present invention is so constructed as to temporarily buffer the store data in the store buffer means before storing it in the storage means, store data corresponding to data to be fetched can exist in the store buffer means as data of the same address at the time of the fetch request. In a preferred embodiment of the present invention, therefore, the data is fetched from the storage means in response to the fetch request, and when the store data corresponding to the fetch request exists in the store buffer means, the store data is also fetched from the store buffer means, and both the data items are merged into a single fetch data.

DESCRIPTION OF THE PREFERRED EMBODIMENT

Figure 1:
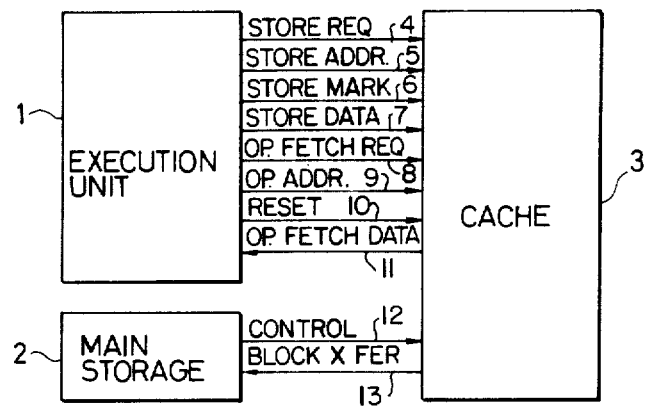
FIG. 1 is a block diagram showing an embodiment of the present invention.

FIG. 1 illustrates the exchange of signals (interfaces) between an execution unit 1, a main storage 2 and a cache 3, and provides only the signals pertinent to the present invention. Lines 4–7 carry a group of signals concerning the "store" operation, in which the line 4 carries a store request, the line 5 carries a store address, the line 6 carries a store mark, and the line 7 carries store data. The store mark indicates a byte position or positions, within a plurality of bytes of the store data to be stored, identifying the byte or bytes for which the store operation is to be performed. Assuming by way of example that the store data depth of the cache is 8 bytes, the store mark is composed of 8 bits, and the store operation is executed with respect to the byte or bytes corresponding to that bit or bits of the store mark which have the value "1". In case of re-storing all the 8 bytes of data, all the 8 bits of the store mark are "1".

Lines 8, 9 and 11 carry a group of signals concerning the "operand fetch" operation, in which the line 8 carries an operand fetch request, the line 9 carries an operand address, and the line 11 carries the operand fetch data. A line 10 carries a reset signal, which resets control flip-flops in the cache 3. The lines 4–10 are the lines carrying signals or data which are sent from the execution unit 1 to the cache 3, whereas the line 11 is the signal representing the data which is sent from the cache 3 to the execution unit 1. A line 12 and a line 13 form a control line and a data line concerning the block transfer and store operation for storing blocks of data in the main storage 2.

Figure 2:
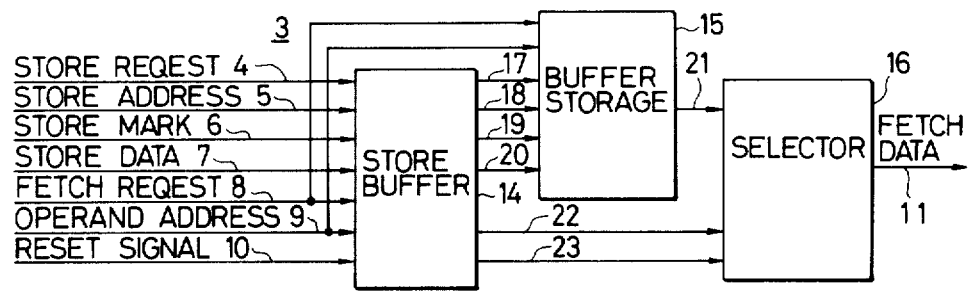
FIG. 2 is a block diagram showing the details of the cache in FIG. 1.

FIG. 2 shows the details of the cache 3 in FIG. 1. The cache 3 is constructed of a buffer storage 15 as original storage means, a store buffer 14, and a selector 16. The store data from the execution unit 1 to the cache 3 is first stored and temporarily buffered in the store buffer 14, and then is transferred from the store buffer 14 into the buffer storage 15.

The buffer storage 15 is a memory which is small in capacity and high in speed as compared with the main storage 2, and which holds as copies some of the data retained by the main storage 2. Accordingly, when data requested exists in the buffer storage 15, the data processing unit 1 can fetch the data from the buffer storage 15 faster than in the case of utilizing the data retained in the main storage 2.

In FIG. 2, lines 4–11 are the same as those lines 4–11 in FIG. 1. Lines 17–19 are control lines and line 20 is a data line, each of these lines 17–20 being concerned with the store of signals or data which is sent from the store buffer 14 to the buffer storage 15. The line 17 carries a write pulse for store data, the line 18 carries a store address, the line 19 a store mark, and the line 20 the store data. Only when the line 17 is "on", will the operand on the line 20 specified by the line 19 be stored into the location of the buffer storage 15 specified by the line 18. Each of the lines 8 and 9 is also connected to the buffer storage 15, and when an operand fetch request is issued, the line 8 turns "on", to fetch an operand onto a line 21 from the location of the buffer storage 15 specified by the line 9. In the case where the operand requested to be fetched is queuing in the store buffer 14, the particular operand and the corresponding store mark are fetched from the store buffer 14 onto a line 23 and a line 22, respectively. At this time, the operand requested to be fetched is simultaneously fethed from the buffer storage 15 onto the line 21. Herein, within the operand on the line 21 only the byte parts which correspond to "0" in the store mark on the line 22 are valid. The byte parts which correspond to the "1" positions of the store mark are extracted from the operand which is provided on the line 23. The selection of the lines 21 and 23 dependent upon the store mark is performed by the selector 16. This is based on the fact that, since those parts of the operand in the store buffer 14 which correspond to "1" in the store mark represent valid data waiting to be stored in the buffer storage 15 to update what is stored in the buffer storage 15, the operand on the line 23 needs to be used for those byte parts which correspond to "1" in the store mark if a fully-valid operand is to be fetched.

Figure 3:
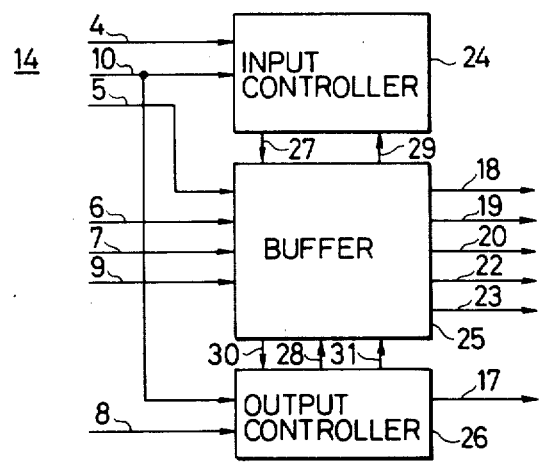
FIG. 3 is a block diagram showing the details of the store buffer in FIG. 2.

FIG. 3 illustrates the details of the store buffer 14. In FIG. 3, lines 4–10 are the same as those lines similarly identified in FIGS. 1 and 2, and lines 17–20 and lines 22,23 are the dame as those lines similarly identified in FIG. 2. A buffer 25 has a plurality of registers for queuing the address, mark, data, etc., of the store. An input controller 24 designates the number of the register in the buffer 25 to receive an input, and informs the buffer 25 of this through a line 27. The buffer 25 determines the register to receive an input by means of this input pointer. An output controller 26 designates the number of the register in the buffer 25 to deliver an output, and informs the buffer 25 of this through a line 28. The buffer 25 determines the register to deliver an output by means of this output pointer.

When the store request exists (the line 4 is "on"), the store address (on the line 5) is compared with address parts held by the group of registers in the buffer 25. In case of coincidence, the line 29 turns "on" to indicate that the store operand to be inputted to the buffer 25 anew is already queuing in one of the registers within the buffer 25. The lines 29 are equal in number to the number of registers in the buffer 25. When one of the lines 29 has turned "on", the input pointer 27 specifies the register which corresponds to the line which has turned "on". This is effected in order that, when the store operations for an identical location are consecutive and the second store operation has arisen while the first store operation has the operand still in the buffer 25, only a part to be altered in the second store operation, within the operand in the register in which the first store operation is queuing, may be updated in advance. When all the lines 29 are "off", the input pointer is cyclically incremented, and the respective store data is successively inputted to the vacant registers in the buffer 25.

Lines 30 are disposed in correspondence with the respective registers in the buffer 25, and they indicate the validity of the respective registers. The register becomes valid during the period of time from the input of the store data till the output thereof. When any of the lines 30 is "on", the output controller 26 operates to transfer the store data queuing in the buffer 25 to the buffer storage 15, subject to the absence of an operand fetch request (subject to the line 8 being "off"). When all the lines 30 are "on", the store data is transferred to the buffer storage 15 irrespective of the presence or absence of the operand fetch request. Lines 31 are reset lines for flip-flops indicating the validity of the respecitve registers in the buffer 25, and they are disposed in a number equal to that of the registers in the buffer 25.

Figure 4:
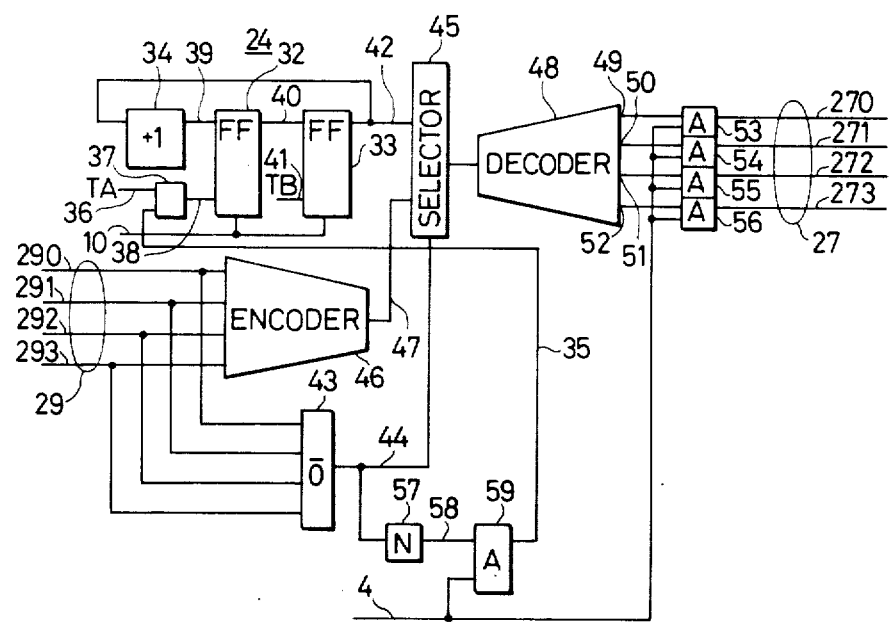
FIG. 4 is a block diagram showing the details of the input controller in FIG. 3.

FIG. 4 illustrates the details of the input controller 24. In FIG. 4, lines 4 and 10 are the same as those similarly identified in FIGS. 1–3. Lines 290–293 are respective lines in the case where the number of the lines 29 in FIG. 3 is four. Accordingly, this practical example supposes a case where the number of the registers in the buffer 25 is four. Likewise, lines 270–273 illustrate respective lines in the case where the number of the lines 27 in FIG. 3 is set at four.

Each of two flip-flops (hereinbelow, termed "FFs") 32 and 33 is a FF of 2 bits. When a line 35 is turned "on" and a clock line TA 36 is "on", the output line 38 of an AND gate 37 turns "on", so that a 2-bit output from an incrementor 34 is applied to the FF 32 through a data input line 39. The 2-bit output of the FF 32 is applied to the FF 33 when a clock line TB 41 is "on". The clocks TA and TB are clocks of 2 phases. The 2-bit output of the FF 33 is applied to the incrementor 34 through a line 42 and is incremented therein, and the result is reflected on the line 39. Accordingly, each time the line 35 turns "on", the values of the FFs 32 and 33 are updated cyclically as "00"→"01"→"10"→"11"→"00". The FFs 32 and 33, when reset by the reset line 10, are initialized to the value "00". Thus, the FFs 32 and 33 form a four-step binary counter.

When a store request has been issued anew, the address of the store request is compared with the address parts of the four registers in the buffer 25, and that one of the lines 290–293 which corresponds to the register having that store address therein, if any, turns "on". Since the four registers of the buffer 25 are adapted to hold store addresses different from one another, two or more of the lines 290–293 do not turn "on" at the same time. When any one of the lines 290–293 has turned "on", the output line 44 of an OR circuit 43 turns "on", and a selector 45 selects the output 47 of an encoder 46. The output of the encoder 46 consists of two signal lines which are encoded so as to indicate which ones of the lines 290–293 have turned "on". That is, the line 47 becomes "00" when the line 290 is "on"; "01" when the line 291 is "on"; "10" when the line 292 is "on"; and "11" when the line 293 is "on". Accordingly, the output 47 indicates the number of that register in the buffer 25 whose store address has produced coincidence.

A decoder 48 decodes the output of the selector 45 to turn "on" one of its output lines 49–52. The lines 49–52 are applied to respective AND gates 53–56 along with the line 4 (the store request). When the AND gates are enabled, they turn "on" the respective lines 270–273. Owing to the above operations, when the store request has been issued anew and the store address coincides with any one of the address parts of the four registers in the buffer 25, one of the lines 270–273 corresponding to the coincident register turns "on", so that the store information can be overlaid in the particular register.

When none of the four registers produces coincidence with the received store address, the output line 58 of a NOT circuit 57 turns "on", and an AND circuit 59 is enabled by the store request, to turn "on" the output line 35. As a result, the FF 32 is supplied with the output of the incrementor 34 and is incremented. Since, at this time, the line 44 is in the "off" state, the selector 45 selects the input line 42. Accordingly, the decoded result of the value of the FF 33 is reflected on the lines 270–273 and instructs the input of the received operand into a vacant register (the next register to the register having received the input of an operand in the preceding store operation) in the buffer 25.

Figure 5:
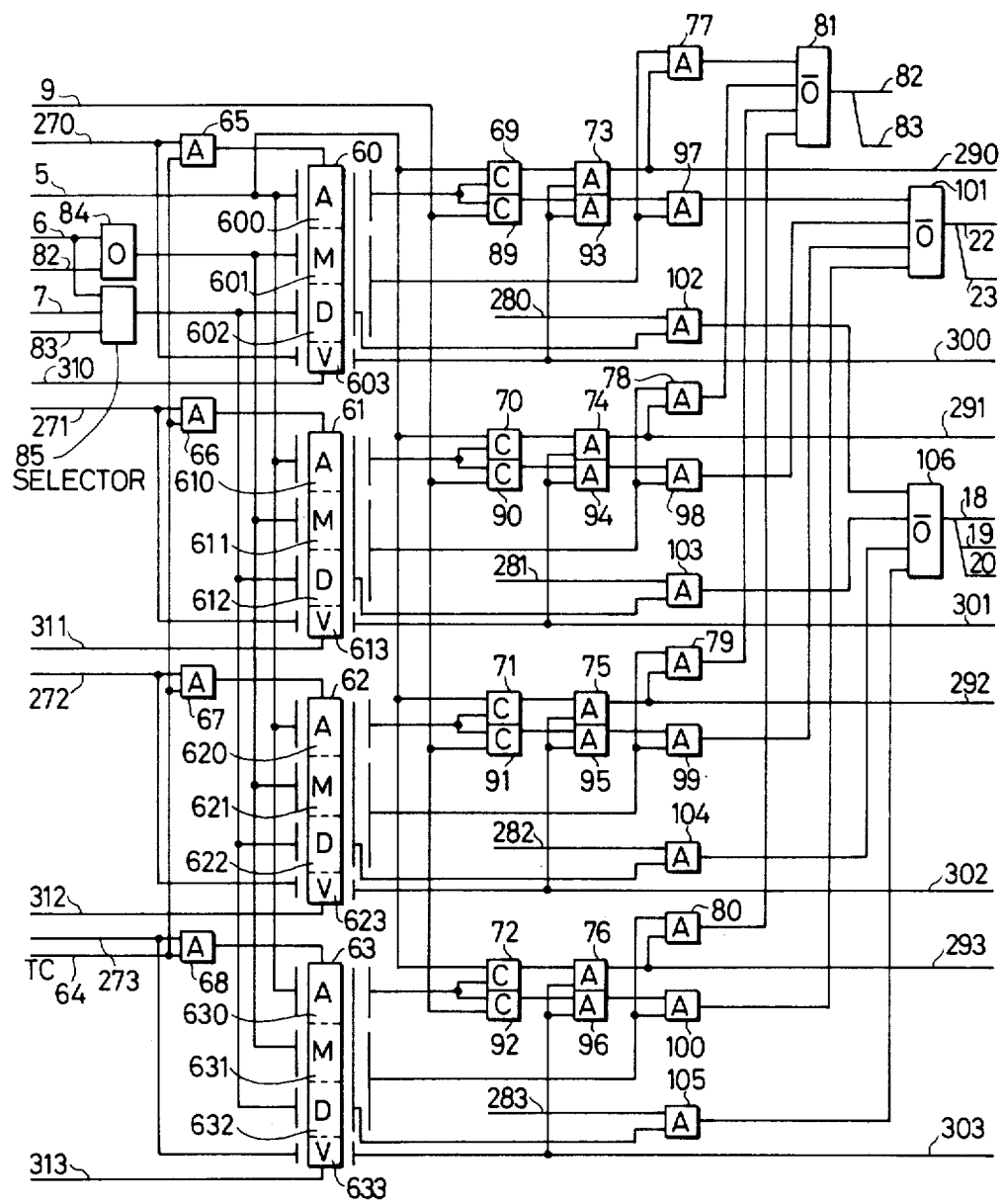
FIG. 5 is a block diagram showing the details of the buffer in FIG. 3.

FIG. 5 illustrates the details of the buffer 25. In FIG. 5, lines 5–7 and 9 are the same as those similarly designated in FIGS. 1–3, and lines 270–273 and lines 290–293 are the same as those similarly designated in FIG. 4. Each register 60–63 is constructed of a store address part 600, 610, 620, 630, a store mark part 601, 611, 621, 631, a store data part 602, 612, 622, 632, and a valid bit 613, 623, 633. When any one of the input instructive lines 270–273 is "on" and a clock line TC 64 is "on", the output line of the corresponding one of the AND circuits 65–68 turns "on", and the content of the corresponding register is updated in accordance with the data received on lines 5–7. As the updating values, the store address is given from the line 5, the store mark is applied from the line 6, and the store data is received from the line 7. The valid bits are respectively set by the input instructive lines 270–273 directly. The outputs of the address parts 600, 610, 620 and 630 of the registers 60–63 are compared with the store address of the input line 5 by comparators 69–72. When they detect coincidence, only the registers having valid bits 603, 613, 623 and 633 are allowed to turn "on" the output lines 290–293 by way of AND circuits 73–76, respectively.

When one of the output lines 290–293 is "on", a corresponding one of the AND circuits 77–80 will be enabled to apply the store mark and store data in the corresponding one of the registers 60–63 to an OR circuit 81. The store mark is delivered to a line 82, and the store data to a line 83. Accordingly, in a case where, at the time of the issue of a new store request, the store data for that store address is still being buffered in the store buffer 25, one of the output lines 290–293 turns "on", and the store mark and store data corresponding thereto are respectively delivered to the lines 82 and 83. The store mark on the line 82 is applied to an OR circuit 84 and is ORed with the store mark on the line 6 based on the new store request, and the result is stored in the store mark part of the register as the updated store mark. Of course, each store mark of 8 bits has the same bit positions subjected to the OR operations.

Figure 6:
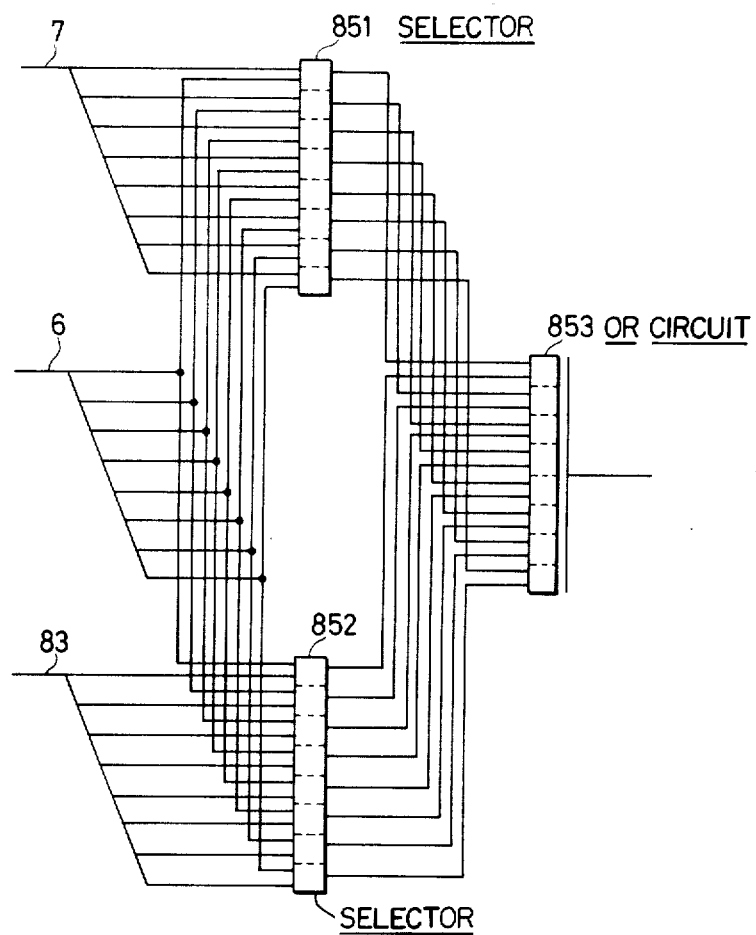
FIG. 6 is a block diagram showing the details of the selector in FIG. 5.

The store data on the line 83 is applied to a selector 85, which is shown in detail in FIG. 6. The store data based on the new store request is inputted to a selector 851 through the line 7, while the store data read from the register in the buffer 25 is inputted to a selector 852 through the line 83. The selector 851 selects the data of those bytes of the line 7 which correspond to the bits "1" of the store mark of the line 6, and it delivers them to an OR circuit 853. The selector 852 selects the data of those bytes of the line 83 which correspond to the bits "0" of the store mark of the line 6, and it delivers them to the OR circuit 853. Thus, the updated store data merged with the store mark is delivered from the OR circuit 853, and it is stored in the store data part of the register.

Comparators 89–92 compare the contents of the address parts 600, 610, 620, 630 of the registers 60–63 with the operand address of the operand fetch address line 9. Upon detecting a coincidence, they turn "on" their output lines, and the AND result of the coincidence signals with the corresponding valid bits 603, 613, 623, 633 are taken by AND circuits 93–96. Each of the results is given as one input of the corresponding one of AND circuits 97–100 at the succeeding state. The AND circuits 97–100 determine whether or not the store mark parts 601, 611, 621, 631 and store data parts 602, 612, 622, 632 of the respective registers are reflected on the inputs of an OR circuit 101. Accordingly, the output of the OR circuit 101 provides the store mark part and store data part of the register which has been allowed by any of the AND circuits 97–100 (as to which the AND has been established). This signifies that the data corresponding to the fetch request exists also in the store buffer 25 and is outputted. The output of the OR circuit 101 is applied to the selector 16 (FIG. 2) on lines 22 and 23.

When any one of lines 280–283 is "on", an AND circuit 102 105 transmits the store address part, store mark part and store data part of the corresponding register 60–63 to an OR circuit 106. On the output lines 18–20 of the OR circuit 106, accordingly, the address, mark and data of the register corresponding to the line 280–283 are selected. These outputs of the OR circuit 106 are applied to the buffer storage 15 (FIG. 2).

Figure 7:
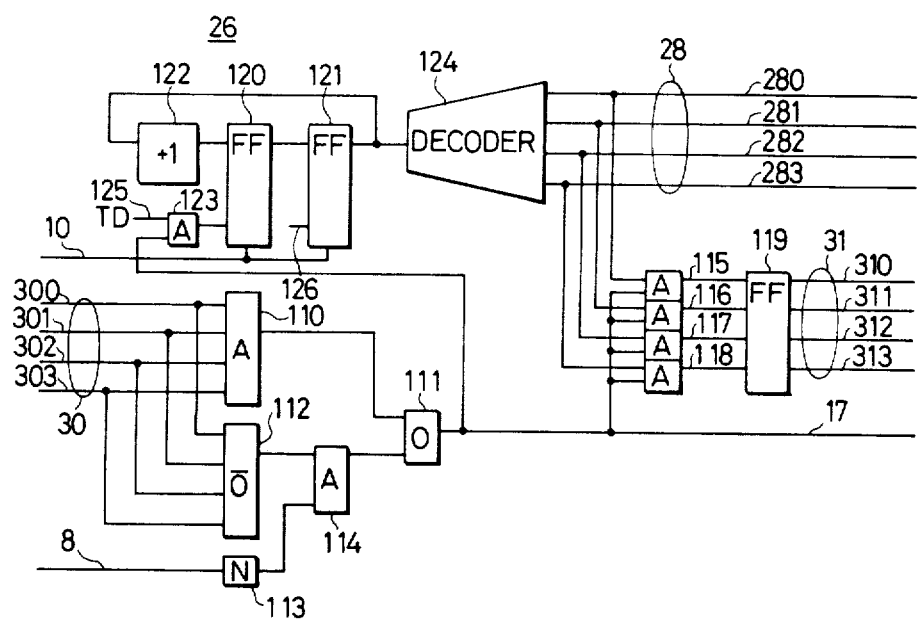
FIG. 7 is a block diagram showing the details of the output controller in FIG. 3.

FIG. 7 illustrates the details of the output controller 26. In FIG. 7 lines 8, 10 and 17 are the same as those similarly designated in FIGS. 2 and 3, and lines 300–303, lines 280–283 and lines 310–313 are respectively the same as those of the same reference numerals in FIG. 5. In a case where all the valid bit lines 300–303 of the four registers of the buffer 25 are in the "on" states, that is, where all the four registers hold valid store information, this situation is detected by an AND circuit 110, and the line 17 instructive of the store of the store data into the buffer storage 15 is turned "on" from the output of an OR circuit 111. In this case, the store of data into the buffer storage 15 is executed with priority given thereto over the fetch request.

When all the lines 300–303 are not "on" but at least one of them is "on", this situation is detected by an OR circuit 112. When the output of the OR circuit 112 is "on", the presence or absence of the operand fetch request is tested by a NOT circuit 113 and an AND circuit 114. In the presence of the operand fetch request, the line 8 turns "on", and the output of the OR circuit 112 is inhibited by the NOT circuit 113 and AND circuit 114. Accordingly, only in the absence of the operand fetch request for the buffer storage 15, will the output of the OR circuit 112 be reflected on the line 17 to cause the store of data into the buffer storage 15. When the line 17 is "on", the store address, mark and data to be transmitted to the buffer storage 15 are applied from the register which has been selected by the lines 280-283 to the buffer 25.

The signal of the store instructive line 17 and the signals of the output instructive lines 280-283 are respectively subjected to an AND operation by AND circuits 115-118, and the results are latched for phase adjustments by a FF 119. The output 310-313 of the FF 119 turns "off" the valid bit of the register in the buffer 25 which has been instructed to deliver the outputs.

Each of FFs 120 and 121 is an FF of 2 bits. More particularly, when both the line 17 and a timing line TD 125 are "on", the output of an AND circuit 123 turns "on" to update the content of the FF 120. The updated value of the FF 120 is given by an incrementor 122, and it is equal to the content of the FF 121 with 1 (one) added thereto. The FFs 120 and 121 are reset to the initial value "00" by the reset line 10. Accordingly, each time the line 17 turns "on", the contents of the FFs 120 and 121 are incremented cyclically as "00"→"01"→"10"→"11"→"00". The output of the FF 121 is decoded by a decoder 124, and the decoder 124 turns "on" one of the output instructive lines 280-283 corresponding to the above output.

Referring to FIG. 5 again, when one of the output instructive lines 280-283 is turned "on", the corresponding one of the AND circuits 102-105 is enabled, and the store address, store mark and store data in the register are transmitted to the buffer storage 15. At the same time, the valid bit part of the particular register is turned "off" by the corresponding lines 310-313.

Figure 8:
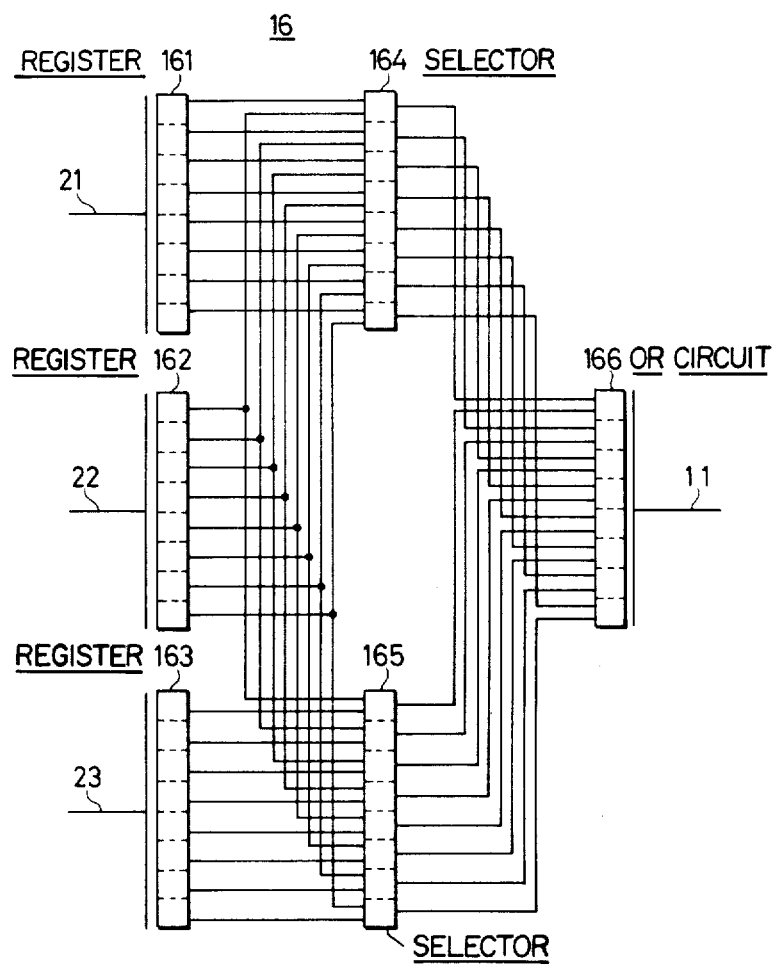
FIG. 8 is a block diagram showing the details of the selector in FIG. 2.

FIG. 8 illustrates the details of the selector 16 in FIG. 2. In FIG. 8, lines 11, 21, 22 and 23 are the same as those similarly identified in FIG. 1 and so forth. FIG. 8 shows an example in which the fetch/store depth of the buffer storage 15 is 8 bytes. Data of 8 bytes fetched from the buffer storage 15 (FIG. 2) is set in a register 161 of 8 bytes through the line 21. The store mark of 8 bits and the data of 8 bytes, which have been fetched from the store buffer 14, are respectively set in a register 162 of 8 bits and a register 163 of 8 bytes. A selector 164 selects the data of those bytes of the register 161 which correspond to the bits "0" of the mark of the register 162, and it delivers them to an OR circuit 166. A selector 165 selects the data of those bytes of the register 163 which correspond to the bits "1" of the mark of the register 162, and it delivers them to the OR circuit 166. Thus, the data from the buffer storage 15 and the store buffer 14 merged with the store mark are provided from the OR circuit 166 as fetch data meeting the fetch request.

According to the present invention, the competition of a store request and an instruction or operand fetch request for a storage can be reduced, so that the delay of instruction or operand fetch attributed to the competition is shortened advantageously.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A storage system comprising:
main storage means for storing data;
cache storage means coupled to said main storage means for storing a portion of the data stored in said main storage means, said cache storage means operating to store data in response to receipt of a write pulse and a store address and to read out data in response to receipt of a fetch request and a fetch address;
request generating means for generating a fetch address together with a fetch request when data is to be fetched from said cache storage means, and for generating a store address, store data and a store mark together with a store request when data is to be stored in said storage means, said store mark identifying that portion of the store data to be stored in said cache storage means; and
store buffer means coupled to said cache storage means and said request generating means for temporarily storing data before it is stored in said cache storage means, including a plurality of register means for storing the store address, store data and store mark from said request generating means into one of said register means in response to receipt of the store request for said request generating means input control means for specifying in regular order the register means to store the store address, store data and store mark accompanied by the store request, in response to said store request, means for transferring said store address, store data and store mark stored in said register means to said cache storage means along with a write pulse at a time when no fetch request is being generated by said request generating means, output control means for specifying in regular order the register means storing the store address, store data and store mark to be transferred to said cache storage means, comparison means for comparing the fetch address accompanied by the fetch request from said request generating means and the store addresses stored in the respective register means, and for providing coincidence signals indicating coincidence between said addresses, and output means responsive to the coincidence signal from the comparison means for controlling said transferring means to output the store data and store mark from the register means which said comparison means indicates has provided said coincidence; and
means for merging the data read from said cache storage means in response to the fetch request and the portion of said store data outputted under control of said output means and identified by said store mark outputted from said store buffer means.

2. A storage system comprising:
main storage means for storing data;
cache storage means coupled to said main storage means for storing a portion of the data stored in said main storage means, said cache storage means operating to store data in response to receipt of a write pulse and a store address and to read out data in response to receipt of a fetch request and a fetch address;

request generating means for generating a fetch address together with a fetch request when data is to be fetched from said cache storage means, and for generating a store address, store data and a store mark together with a store request when data is to be stored in said storage means, said store mark identifying that portion of the store data to be stored in said cache storage means; and store buffer means coupled to said cache storage means and said request generating means for temporarily storing data before it is stored in said cache storage means, including a plurality of register means for storing the store address, store data and store mark from said request generating means into one of said register means in response to receipt of the store request for said request generating means input control means for specifying in regular order the register means to store the store address, store data and store mark accompanied by the store request, in response to said store request, means for transferring said store address, store data and store mark stored in said register means to said cache storage means along with a write pulse at a time when no fetch request is being generated by said request generating means, output control means for specifying in regular order the register means storing the store address, store data and store mark to be transferred to said cache storage means, comparison means for comparing the store address accompanied by the store request from said request generating means and the store addresses stored in the respective register means and for providing coincidence signals indicating coincidence between said addresses;

said input control means includes means responsive to the coincidence signal being provided from the comparison means for specifying the register means which said comparison means indicates has provided said coincidence; and said store buffer means further including means for merging the store data and store mark stored in said register means which said comparison means indicates has provided said coincidence with the store data and store mark from said request generating means, and means for storing the merged results again into said register means specified by said input control means.

3. A storage system comprising:

main storage means for storing data;

cache storage means coupled to said main storage means for storing a portion of the data stored in said main storage means, said cache storage means operating to store data in response to receipt of a write pulse and a store address and to read out data in response to receipt of a fetch request and a fetch address;

request generating means for generating a fetch address together with a fetch request when data is to be fetched from said cache storage means, and for generating a store address, store data and a store mark together with a store request when data is to be stored in said storage means, said store mark identifying that portion of the store data to be stored in said cache storage means; and store buffer means coupled to said cache storage means and said request generating means for temporarily storing data before it is stored in said cache storage means, including a plurality of register means for storing the store address, store data and store mark from said request generating means into one of said register means in response to receipt of the store request for said request generating means input control means for specifying in regular order the register means to store the store address, store data and store mark accompanied by the store request, in response to said store request, means for transferring said store address, store data and store mark stored in said register means to said cache storage means along with a write pulse at a time when no fetch request is being generated by said request generating means, output control means for specifying in regular order the register means storing the store address, store data and store mark to be transferred to said cache storage means, first comparison means for comparing the store address accompanied by the store request from said request generating means and the store addresses stored in the respective register means and for providing coincidence signals indicating coincidence between said addresses; second comparison means for comparing the fetch address accompanied by the fetch request from said request generating means and the store addresses stored in the respective register means, and for providing coincidence signals indicating coincidence between said addresses; said input control means including means responsive to the coincidence signal from the first comparison means for specifying the register means which said first comparison means indicates has provided said coincidence; means for merging the store data and store mark stored in said register means which said first comparison means indicates has provided said coincidence signal with the store data and store mark from said request generating means, and means for storing the merged results again into said register means specified by said input control means; and output means responsive to the coincidence signal from the second comparison means for controlling said transferring means to output the store data and store mark from the register means which said second comparison means indicates has provided said coincidence signal; and means for merging the data read from said cache storage means in response to the fetch request and the portion of said store data outputted under control of said output means and identified by said store mark outputted from said store buffer means.

* * * * *